(12) United States Patent
Ivans et al.

(10) Patent No.: US 10,414,483 B2
(45) Date of Patent: Sep. 17, 2019

(54) TILTROTOR ARTICULATED WING EXTENSION

(71) Applicant: Bell Helicopter Textron, Inc., Fort Worth, TX (US)

(72) Inventors: Steven Ray Ivans, Ponder, TX (US); Brent Chadwick Ross, Flower Mound, TX (US)

(73) Assignee: Bell Helicopter Textron, Inc., Fort Worth, TX (US)

( * ) Notice: Subject to any disclaimer, the term of this patent is extended or adjusted under 35 U.S.C. 154(b) by 308 days.

(21) Appl. No.: 15/271,721

(22) Filed: Sep. 21, 2016

(65) Prior Publication Data

US 2018/0079487 A1    Mar. 22, 2018

(51) Int. Cl.
| | |
|---|---|
| *B64C 3/56* | (2006.01) |
| *B64C 29/00* | (2006.01) |
| *B64C 1/26* | (2006.01) |
| *B64C 1/30* | (2006.01) |
| *B64C 11/28* | (2006.01) |
| *B64C 27/50* | (2006.01) |

(52) U.S. Cl.
CPC .............. *B64C 3/56* (2013.01); *B64C 1/26* (2013.01); *B64C 1/30* (2013.01); *B64C 11/28* (2013.01); *B64C 27/50* (2013.01); *B64C 29/0033* (2013.01)

(58) Field of Classification Search
CPC .. B64C 3/56; B64C 3/26; B64C 27/52; B64C 29/0033; B64C 35/00
USPC ...................................... 244/17.27
See application file for complete search history.

(56) References Cited

U.S. PATENT DOCUMENTS

| | | | |
|---|---|---|---|
| 2,289,224 A | 7/1942 | Swanson et al. | |
| 2,623,713 A | 12/1952 | Foster | |
| 3,063,660 A | 11/1962 | Jarrell | |
| 3,430,894 A | 3/1969 | Strand et al. | |
| 4,691,878 A * | 9/1987 | Vaughan | B64C 3/56 244/49 |
| 5,310,138 A * | 5/1994 | Fitzgibbon | B64C 3/56 244/49 |
| 5,337,974 A | 8/1994 | Rumberger et al. | |
| 7,802,754 B2 | 9/2010 | Karem | |
| 8,083,172 B2 | 12/2011 | Karem | |
| 8,439,314 B1 * | 5/2013 | Dhall | B60F 5/02 244/2 |

(Continued)

FOREIGN PATENT DOCUMENTS

| | | |
|---|---|---|
| KR | 100822366 B1 | 4/2008 |
| WO | 2009102739 A2 | 8/2009 |

(Continued)

OTHER PUBLICATIONS

European Search Report; European Application No. 16203012.6; dated Nov. 9, 2017; 7 pages.

(Continued)

*Primary Examiner* — Christopher P Ellis
(74) *Attorney, Agent, or Firm* — Lightfoot & Alford PLLC

(57) ABSTRACT

An aircraft has a wing, a pylon carried by the wing, at least one of a rotor system component and a drive system component disposed within the pylon, and a wing extension carried by the at least one of a rotor system component and drive system component, wherein the wing extension is foldable relative to the pylon to selectively reduce an overall space occupied by the aircraft.

10 Claims, 9 Drawing Sheets

(56) References Cited

U.S. PATENT DOCUMENTS

| | | | |
|---|---|---|---|
| 9,102,401 B2 | 8/2015 | Collins et al. | |
| 9,550,567 B1* | 1/2017 | Erdozain, Jr. | B64C 29/02 |
| 9,981,734 B2* | 5/2018 | Ivans | B64C 3/26 |
| 10,167,080 B2* | 1/2019 | Foskey | B64C 29/0033 |
| 2012/0292436 A1* | 11/2012 | Karem | B64C 3/56 |
| | | | 244/49 |
| 2016/0311553 A1* | 10/2016 | Alber | B64D 39/04 |
| 2017/0297698 A1* | 10/2017 | Alber | B64C 29/0033 |
| 2018/0079484 A1* | 3/2018 | Ross | B64C 3/38 |
| 2018/0079502 A1* | 3/2018 | Foskey | B64C 29/0033 |

FOREIGN PATENT DOCUMENTS

| | | |
|---|---|---|
| WO | 2010104509 A1 | 9/2010 |
| WO | 2011018697 A1 | 2/2011 |
| WO | 2013015295 A1 | 1/2013 |

OTHER PUBLICATIONS

Partial European Search Report; European Application No. 16203012.6; dated Jun. 9, 2017; 16 pages.

European Exam Report; European Application No. 16203012.6; dated Dec. 4, 2017; 10 pages.

* cited by examiner

TILTROTOR ARTICULATED WING EXTENSION

CROSS-REFERENCE TO RELATED APPLICATIONS

Not applicable

STATEMENT REGARDING FEDERALLY SPONSORED RESEARCH OR DEVELOPMENT

Not applicable.

REFERENCE TO A MICROFICHE APPENDIX

Not applicable.

BACKGROUND

In some cases, wing extensions are provided to aircraft by attaching wing extensions to nacelles or pylons. While the wing extensions carried by the nacelles or pylons can allow improved efficiency, such as improved efficiency of a tiltrotor aircraft in cruise mode, the wing extensions undesirably increase an overall spatial footprint occupied by the aircraft.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
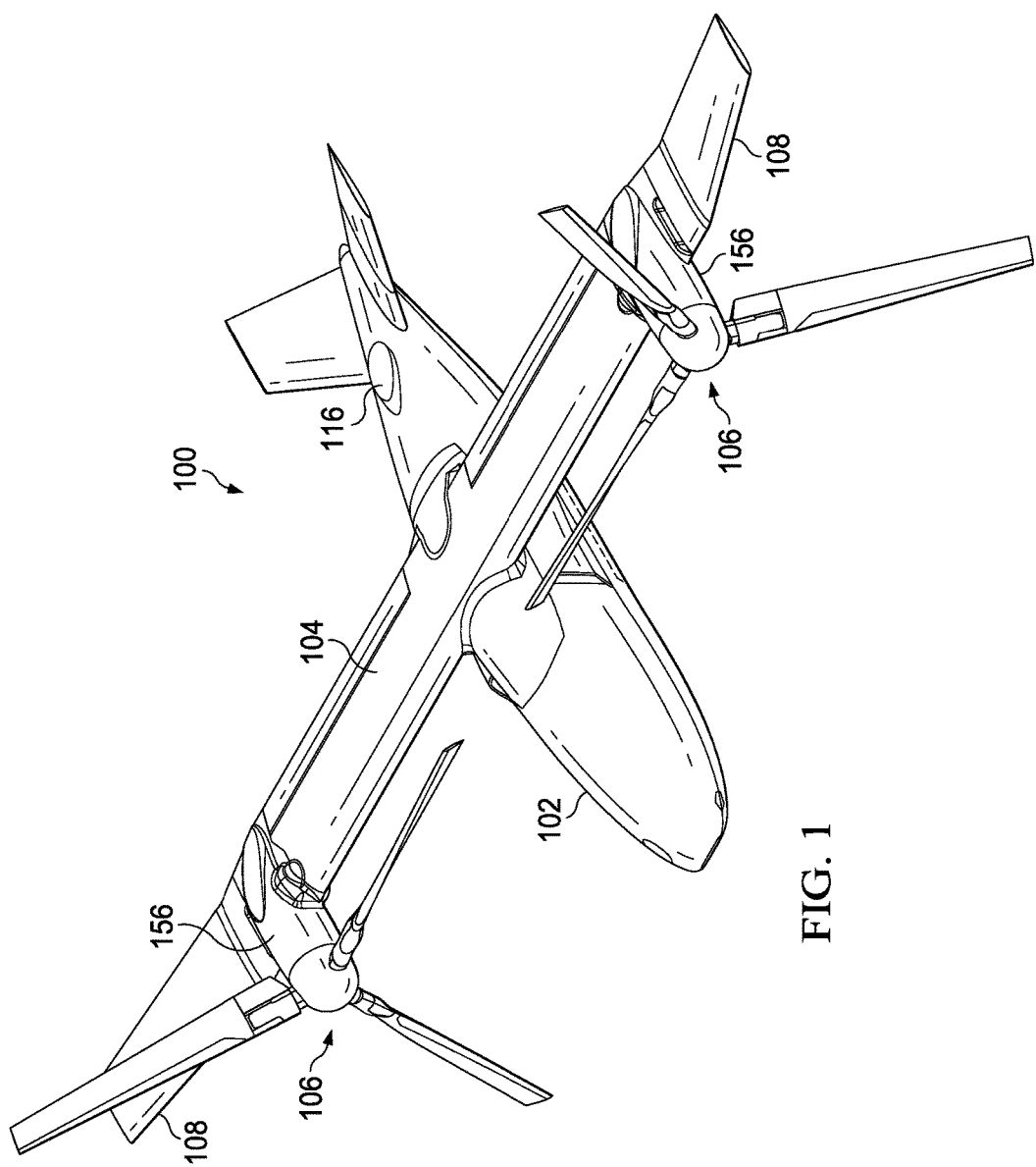
FIG. 1 is an oblique top right view of an aircraft according to the disclosure with the aircraft in a cruise configuration.
Figure 2:
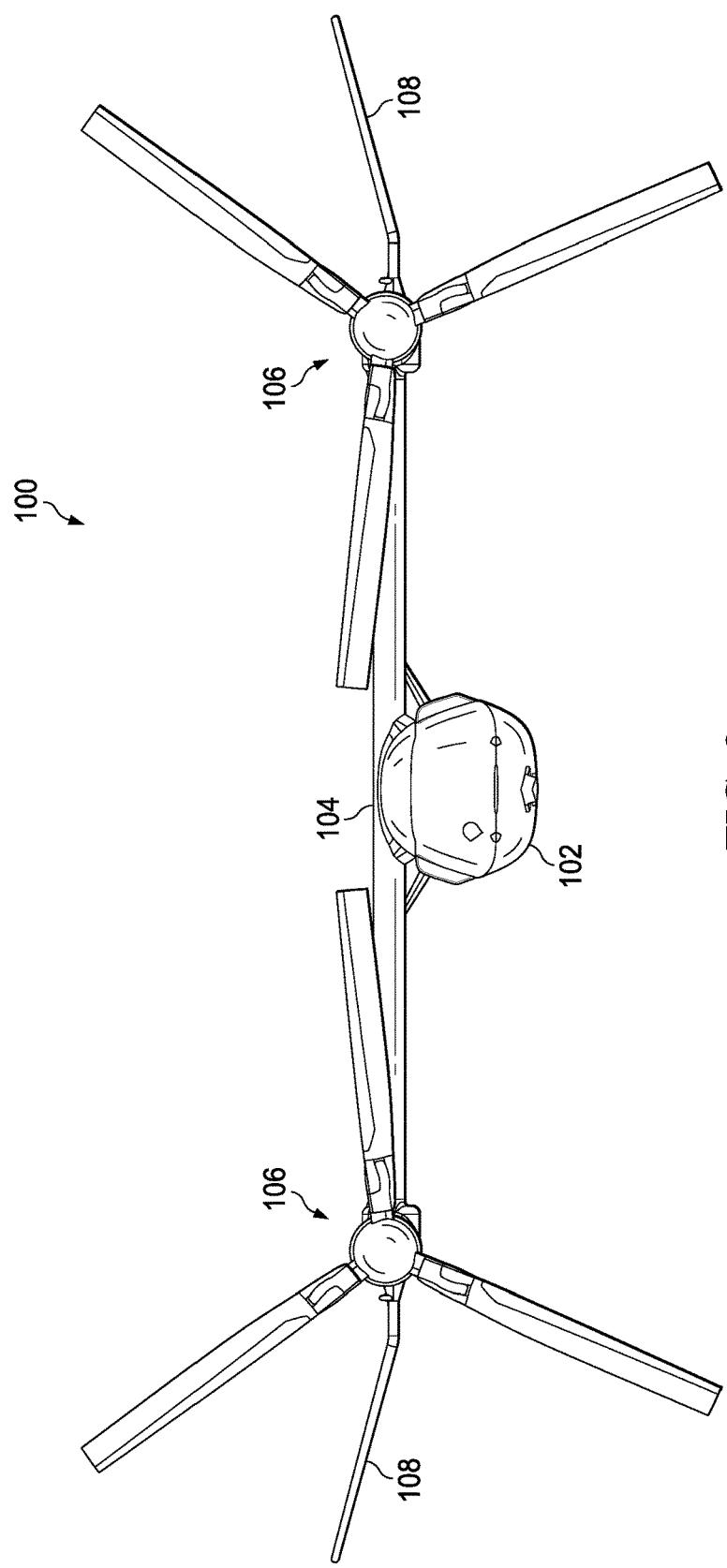
FIG. 2 is a front view of the aircraft of FIG. 1 in a cruise configuration.
Figure 3:
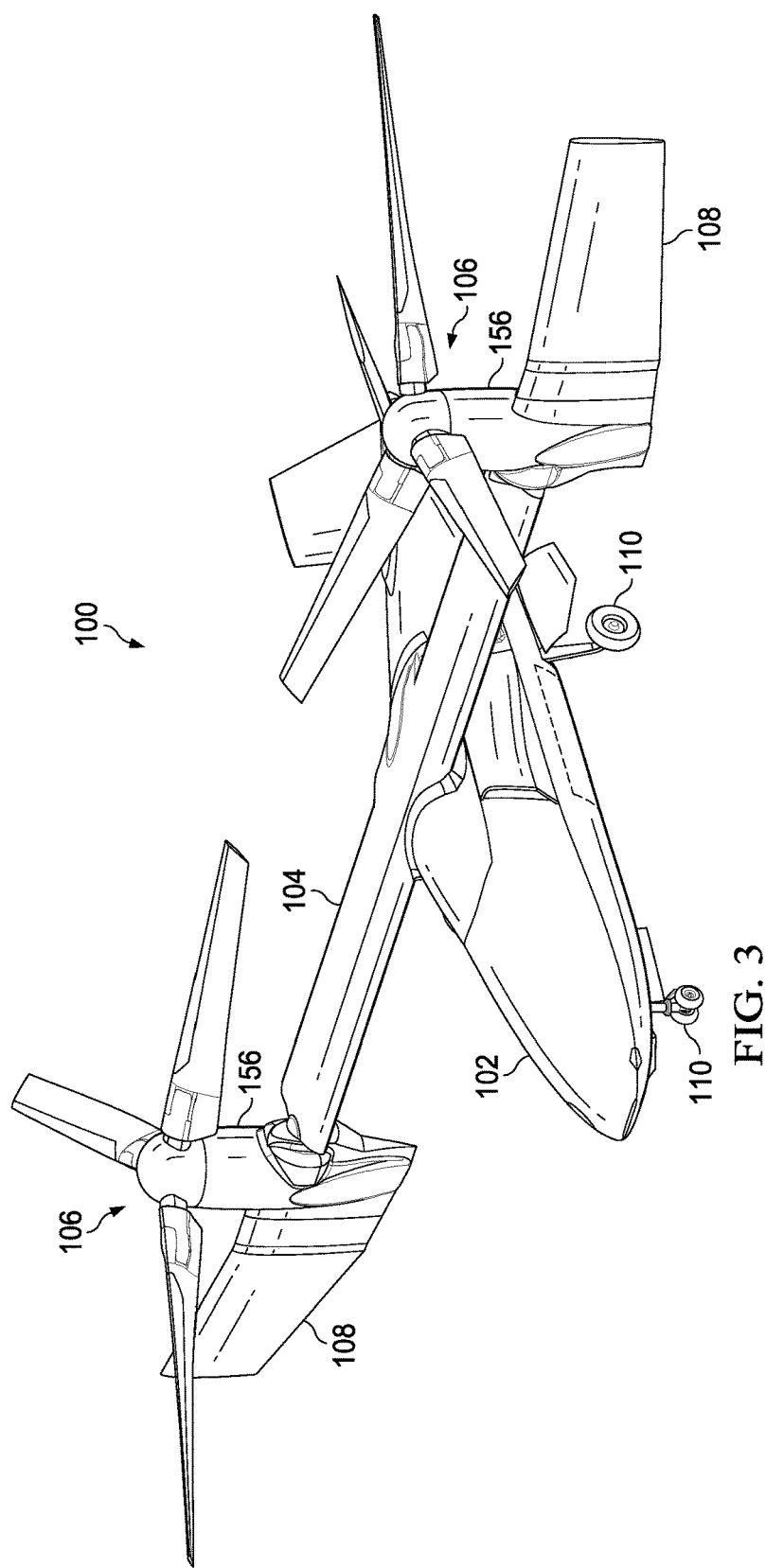
FIG. 3 is an oblique top right view of the aircraft of FIG. 1 with the aircraft in a vertical takeoff and landing (VTOL) configuration.
Figure 4:
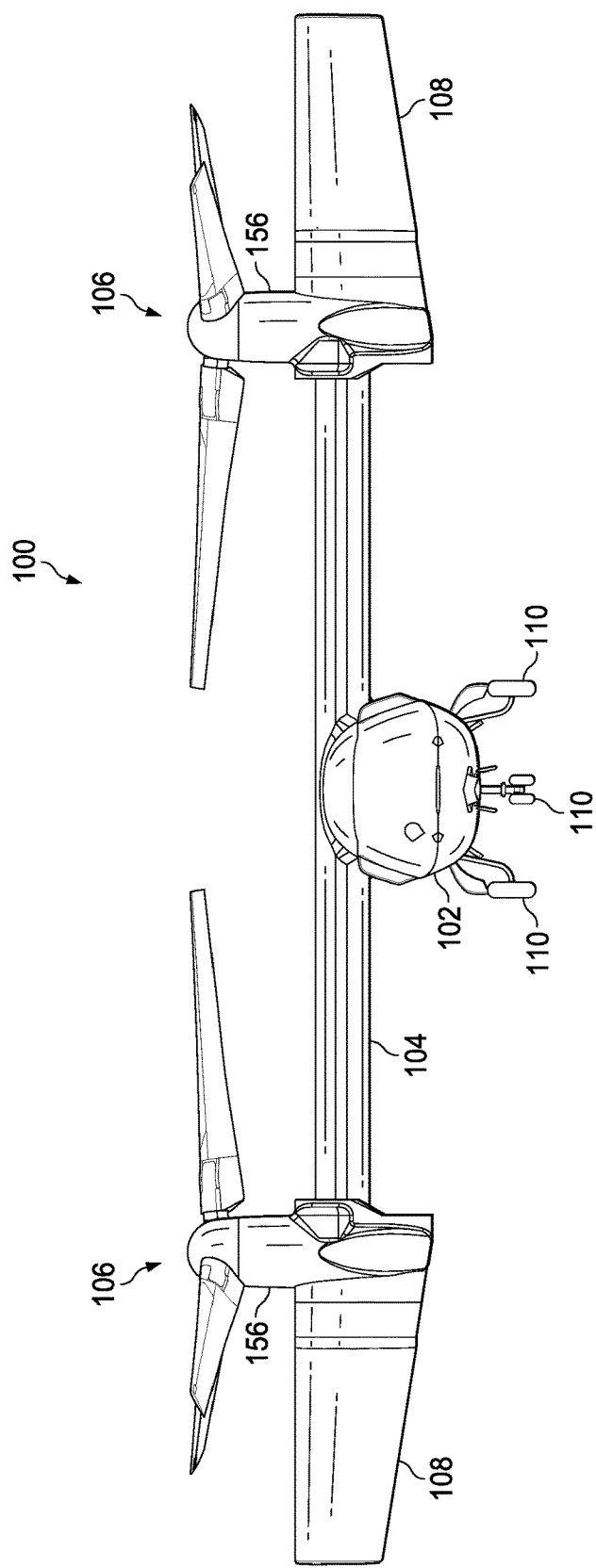
FIG. 4 is a front view of the aircraft of FIG. 1 with the aircraft in a VTOL configuration.
Figure 5:
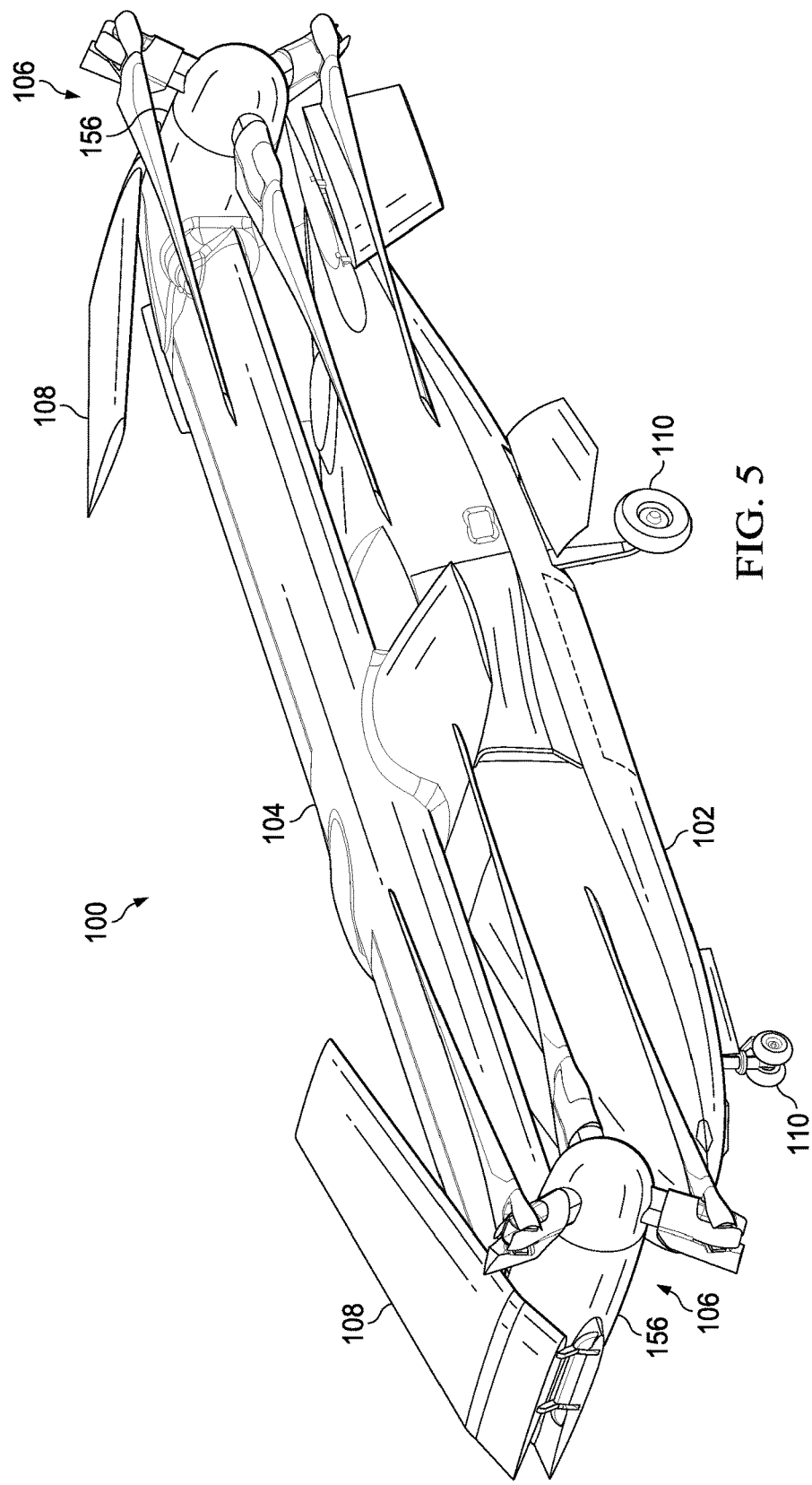
FIG. 5 is an oblique top right view of the aircraft of FIG. 1 with the aircraft in a folded configuration.
Figure 6:
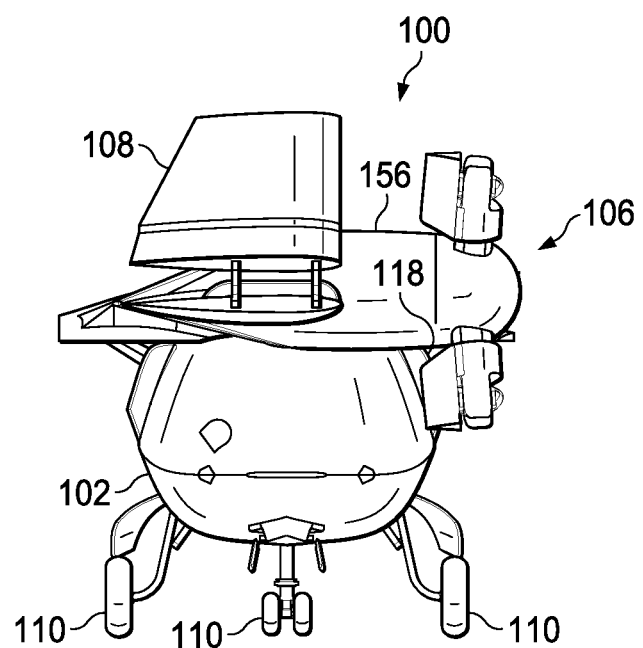
FIG. 6 is a front view of the aircraft of FIG. 1 with the aircraft in a folded configuration.
Figure 7:
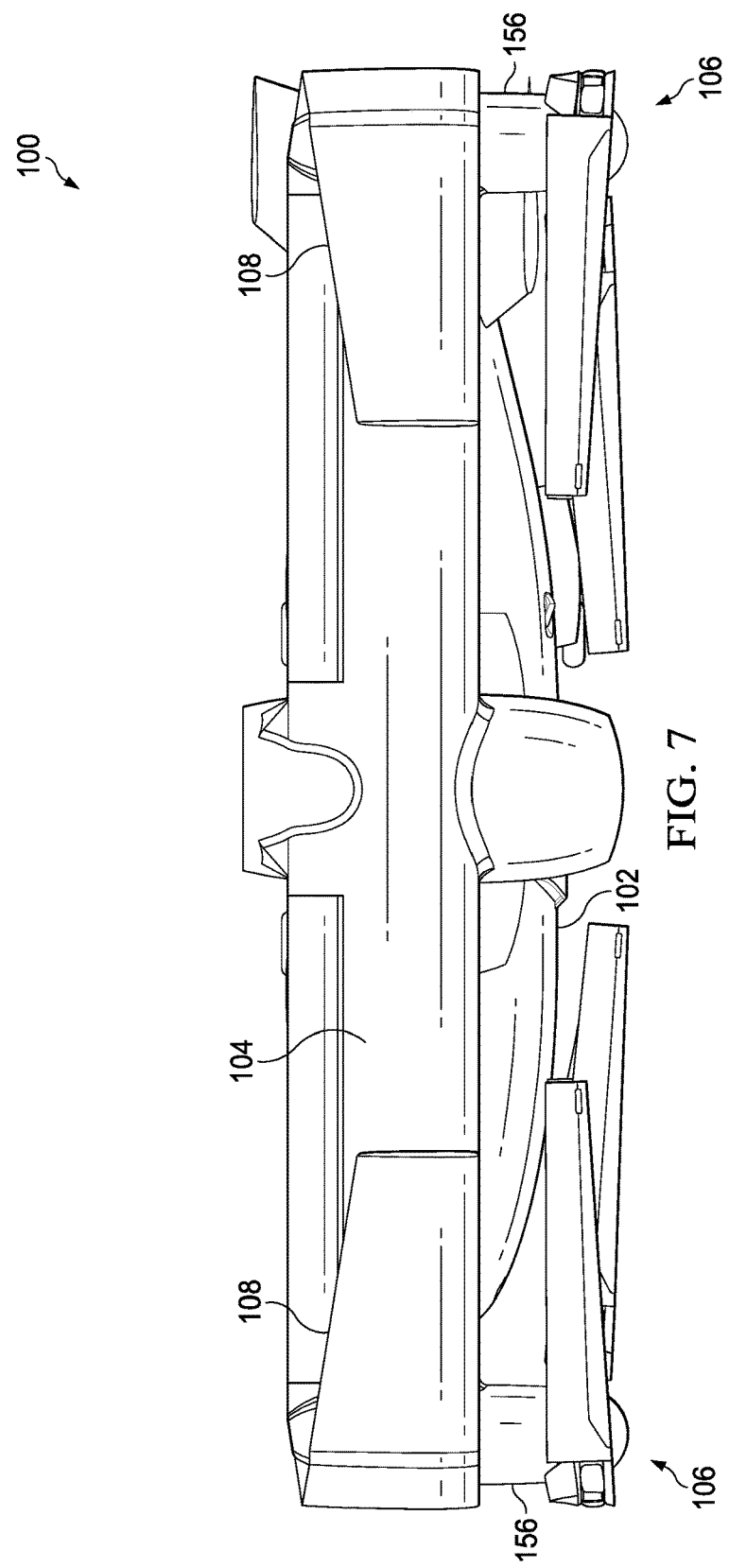
FIG. 7 is a top view of the aircraft of FIG. 1 with the aircraft in a folded configuration.

Referring to FIGS. 1-7 in the drawings, an aircraft 100 is illustrated. The aircraft 100 comprises a tiltrotor unmanned aerial vehicle (UAV). The aircraft 100 comprises a fuselage 102, a wing 104, rotor systems 106, foldable wing extensions 108, and landing gear 110. The aircraft 100 is generally operable in a cruise mode as shown in FIGS. 1 and 2 in which the aircraft 100 orients the rotor systems 106 and wing extensions 108 to allow flight in a manner substantially similar to a fixed wing aircraft. The aircraft 100 is also operable in a vertical takeoff and landing (VTOL) mode as shown in FIGS. 3 and 4 in which the aircraft 100 orients the rotor systems 106 and wing extensions 108 to allow vertical takeoff and landing in a manner substantially similar to a helicopter. In this embodiment, the aircraft 100 can also operate in a transition mode in which the rotors systems 106 and wing extensions 108 are oriented in positions between the positions shown in the cruise mode and the VTOL mode.

Figure 8:
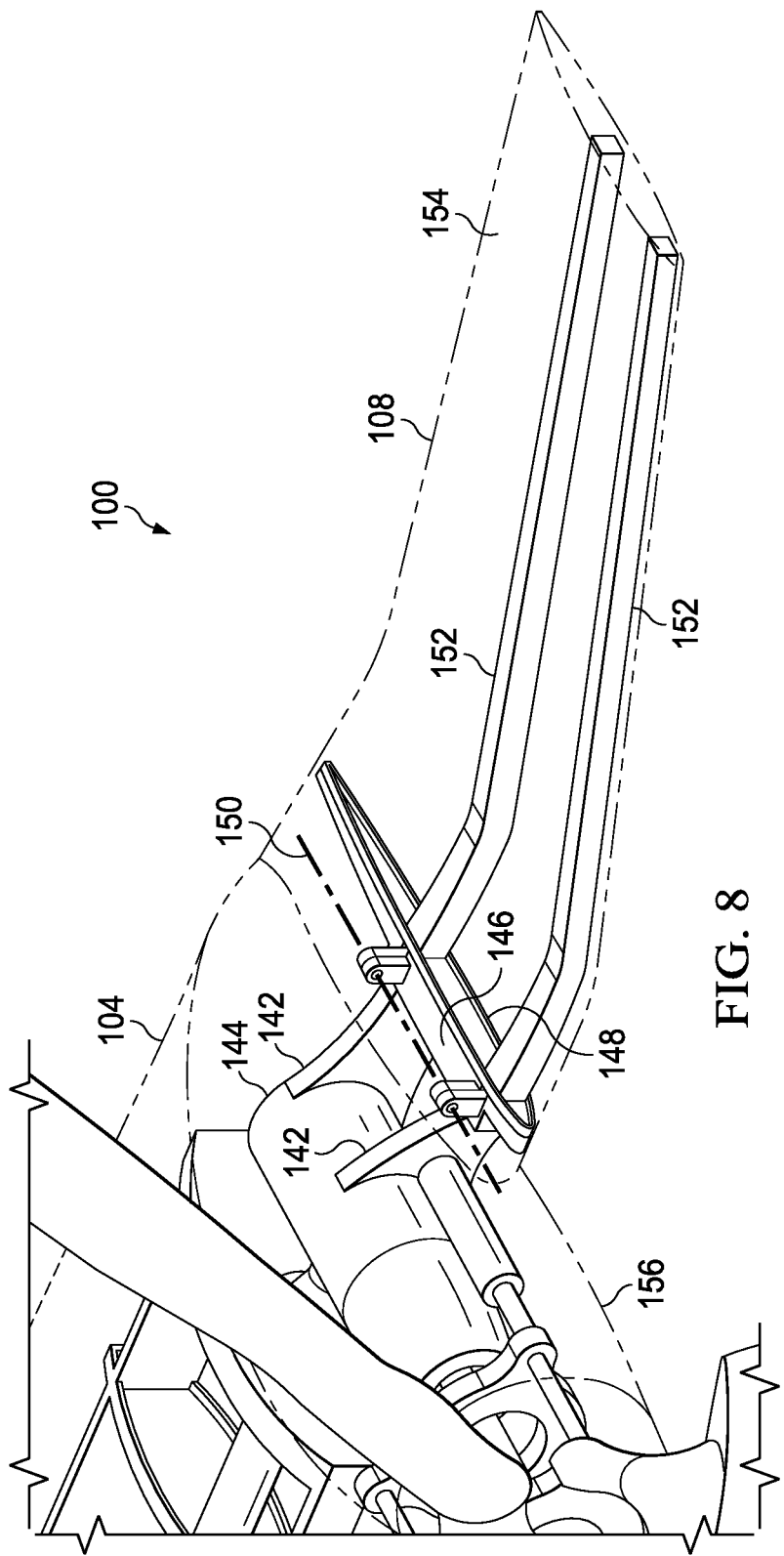
FIG. 8 is an oblique view of a wing extension of the aircraft of FIG. 1 with the wing extension in a deployed configuration.
Figure 9:
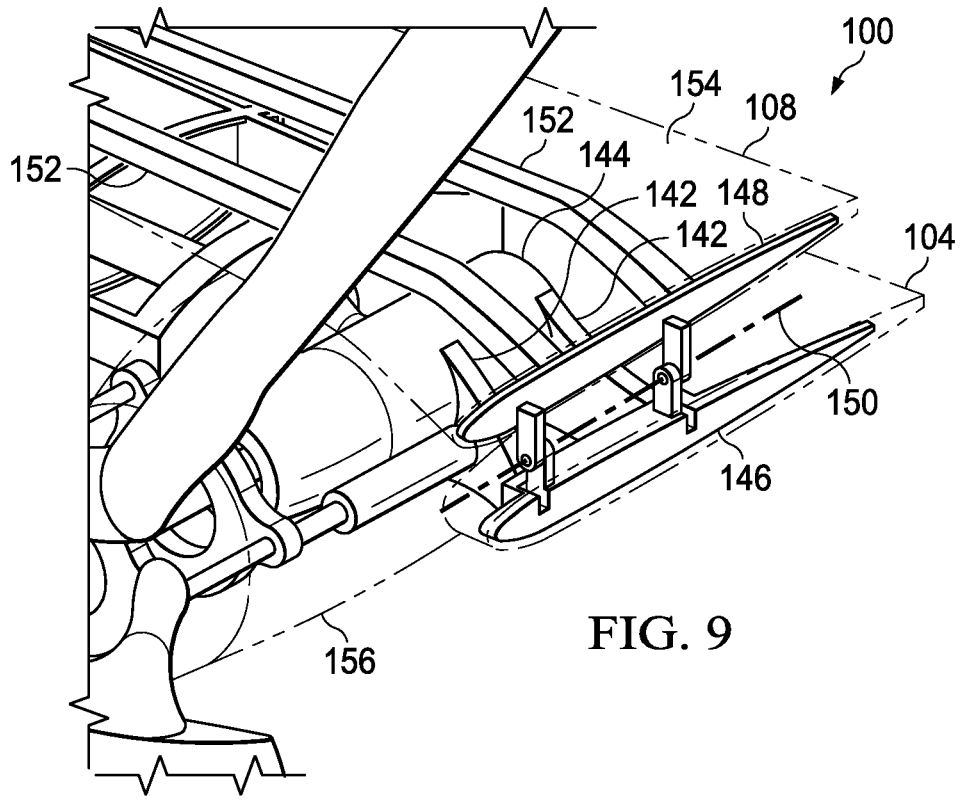
FIG. 9 is a partial oblique view of the wing extension of FIG. 8 with the wing extension in a folded configuration.
Figure 10:
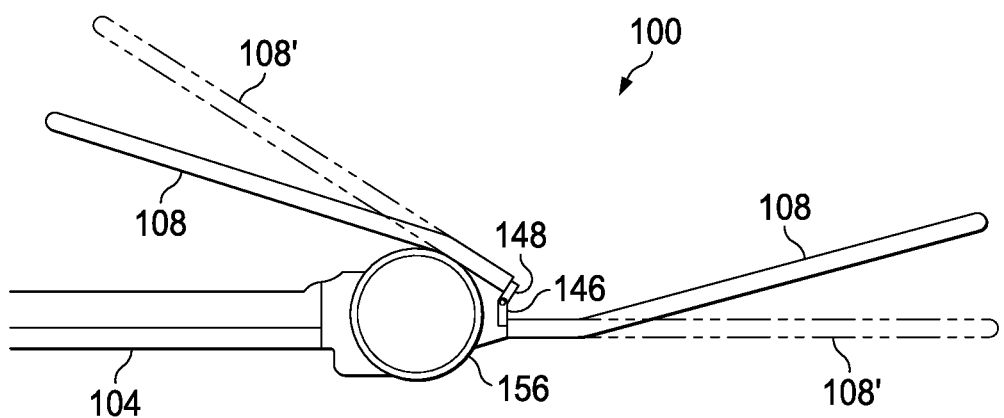
FIG. 10 is a schematic diagram comparing the locations of the wing extension of FIG. 8 in a folded configuration and in a deployed configuration.

Referring now to FIGS. 8-10, the wing extension 108 is shown in greater detail. Most generally, the wing extension 108 comprises at least one mount 142 connected to a proprotor gearbox 144 associated with a rotor system 106, a first hinge portion 146 connected to the mounts 142, and a second hinge portion 148 movably connected to the first hinge portion 146 about a hinge axis 150. The wing extension 108 further comprises one or more struts 152 connected to the second hinge portion 148. The struts 152 generally provide structural support for a skin 154 of the wing extension 108. With reference to FIG. 10, while the wing extension 108 comprises a dihedral configuration, in alternative embodiments, a wing extension 108' may comprise a straight configuration. As shown, in this embodiment, the dihedral shape of the wing extension 108 allows the wing extension to stow in a folded position so that the wing extension 108 can contact a pylon 156 carried by the wing 104 or other outer portion of wing 104 while fitting into a relatively smaller vertical and lateral envelope of space as compared to the straight wing extension 108'.

In some embodiments, the wing extensions 108 are provided to increase cruise efficiency without increasing rotor download excessively in hover, while still allowing the aircraft 100 the ability to fold and fit into confined spaces. The wing extensions 108 are generally horizontal when the aircraft 100 is in a cruise configuration. Because the wing extensions 108 are generally vertical in hover or VTOL configurations, the wing extensions 108 are generally streamline with the rotor system 106 thrust direction. The wing extension 108 does not attach directly to structural components of the wing 104, but rather, attach to components carried in the rotatable pylon 156. In alternative embodiments, wing extensions can comprise straight or anhedral shapes suitable for improved stowing. Further, in alternative embodiments, with differently shaped pylons 156 or other structures, the wing extensions can be shaped to complement the differently shaped pylons and/or structures so that the wing extensions nest against or otherwise abut the pylons and/or other structures in a space efficient manner when folded. In some embodiments, manual pinning and folding/unfolding of the wing extensions 108 can be utilized. However, in alternative embodiments, automated and/or automatic locking/unlocking and folding/unfolding may be utilized. Further, while the wing extensions 108 are shown as folding upward and over the pylon 156, in alternative embodiments, wing extensions can be configured to fold down and/or under the pylon.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ... , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An aircraft, comprising:
   a wing comprising a spanwise axis;
   a pylon carried by the wing;
   at least one of a rotor system component and a drive system component disposed within the pylon; and
   a wing extension carried by an external case of a proprotor gearbox;
   wherein the wing extension is foldable relative to the pylon to selectively reduce an overall space occupied by the aircraft; and
   wherein the pylon is rotatable relative to the wing about the spanwise axis.

2. The aircraft of claim 1, wherein the wing extension is connected to the case using a mount.

3. The aircraft of claim 2, wherein a first hinge portion is connected to the mount.

4. The aircraft of claim 3, wherein a second hinge portion is connected between the wing extension and the first hinge portion.

5. The aircraft of claim 4, wherein the wing extension comprises a strut connected to the second hinge portion.

6. The aircraft of claim 5, wherein the wing extension comprises a skin carried by the strut.

7. The aircraft of claim 6, wherein the wing extension is a dihedral wing extension.

8. The aircraft of claim 1, wherein a shape of the wing extension is complementary to the pylon.

9. The aircraft of claim 1, wherein the wing extension is configured to selectively fold to a position at least partially located above the pylon.

10. The aircraft of claim 1, wherein the wing extension is configured to selectively fold to a position at least partially located below the pylon.

* * * * *